Patented Feb. 7, 1933

1,897,015

UNITED STATES PATENT OFFICE

HARRY M. WEBER, OF BOSTON, MASSACHUSETTS, ASSIGNOR TO ELLIS-FOSTER COMPANY, OF MONTCLAIR, NEW JERSEY, A CORPORATION OF NEW JERSEY

CELLULOSE ESTER COMPOSITION

No Drawing. Application filed April 28, 1925, Serial No. 26,518. Renewed December 15, 1932.

This invention relates to a composition of matter comprising artificial resins and relates especially to resins of complex constitution prepared from resin and non-resin acids and glycerol, glycol or other appropriate alcohol, such complex resins having incorporated with them a toughening agent such as an ester or ether of cellulose and particularly nitrocellulose. In my copending application, Serial 595,862, filed October 20, 1922, now Patent No. 1,722,776, granted July 30, 1929, I have described the preparation and use of complex resins prepared from a resin acid and a non-resin acid normally of a polybasic character and an appropriate alcohol also of a polybasic character.

According to the present invention resins prepared from two or more organic acids other than those of a resinous character produce products which are an improvement for some purposes. That is resins prepared in accordance with the present invention and subsequently incorporated with a cellulose ester or ether such as nitrocellulose have improved properties in that they are tougher, that the range of hardness may be varied to suit the conditions required and they can be prepared in a somewhat greater state of purity. The present invention is especially concerned with the preparation of a resin toughened by means of a cellulose ester or ether which remains permanently fusible and soluble and is adapted for use in the production of films, plastic compositions, molded articles of the shellac type and the like.

As is well known nitrocellulose is not compatible with a great many substances, that is where compatibility may be defined as a substance which is miscible in all proportions with the cellulose ester or ether. In my above mentioned patent the resins prepared in accordance with that invention have this property as well as the resins prepared in accordance with the present invention. While the resins prepared in accordance with my preceding patent may be varied more or less widely in melting point, physical characteristics and so forth, in some cases it is desirable to modify their properties to some extent and this is accomplished by incorporating other organic acids in their constitution and is an object of the present invention.

I have found that acids of a mono-basic character lend themselves admirably to this purpose and that I am able to obtain resins having lower melting points but which when blended with a cellulose ester increase the toughness of the resulting products and this is desirable when for example the toughened resins are to be used in the preparation of spirit varnishes or lacquers and lacquer enamels as the coatings prepared from such toughened resins have greater adhesion to the surface coated and withstand the action of the weather better and furthermore in some cases reduce the quantity of plasticizing agent required in the preparation of such compositions and thereby materially reduce their cost as the plasticizing agent is a more or less expensive item in their preparation. Furthermore when a low melting point resin containing a cellulose ester is used in the preparation of plastic compositions its lower melting point is of advantage as it tends to reduce the danger of decomposing the cellulose ester, particularly where nitrocellulose is the ester used. On the other hand, other of the organic acids increase the melting and softening point of the resin and without sacrificing the desirable property of adhesion and toughness give a somewhat harder coating where the composition is to be used for such a purpose and this is of particular advantage where such coating composition is to be used on furniture and the like where a coating composition of a non-printing nature is desired.

Another object of the present invention is the preparation of artificial resins from two or more organic acids of a non-resinous character with an appropriate alcohol. In the preferred form the resins are prepared from a monobasic acid, a dibasic acid and an appropriate alcohol, preferably in molecular proportions though in some cases it is desirable to vary the proportions depending upon the product desired. Decreasing the quantity of monobasic acid used below molecular proportions with a consequent increase in the quantity of dibasic acid and reacting the mixture with an appropriate alcohol such as glycerol tends to decrease the solubility of the resulting resin, particularly if the resin is subjected to a prolonged heat treatment, but does not render it insoluble. On the other hand increase of the monobasic acid used in the preparation of the composite resin results in a lowering of the softening and melting point of the product and also to a greater or lesser degree renders it more readily soluble. Furthermore the resistance to water of the resins prepared from non-resinous organic acids is somewhat better than those prepared from a resin acid.

As examples of the resins prepared in accordance with the present invention the following are cited:

4/5ths of a mol of benzoic acid, 4/5ths of a mol of phthalic anhydride and 1 mol of glycerol was heated to a temperature of 290° C. and maintained at this point until the acid number of the product had reached the desired low degree. The product was a light colored fusible resin soluble in most of the organic solvents and was compatible with nitrocellulose in all proportions. It will be noted that a slight excess of glycerol is used in the above example and this is desirable as it facilitates the manufacture of the product.

As another example 110 parts of salicylic acid, 118 parts of phthalic anhydride and 94 parts of commercial glycerol were heated in a suitable vessel fitted with a reflux condenser, to a temperature of 290° C. and held at this point until the acid number of the product was less than 20. In the manufacture of this material it is preferable that the temperature of the mixture be brought up to 290° C. somewhat more slowly than in the case of the first example in order that the salicylic acid may combine with the other constituents prior to heating it to its decomposition point. The product obtained was a somewhat harder resin than in the case of the benzoic phthalic glycerol resin, had an acid number of 18 and was soluble in ethyl, butyl and amyl acetate and other solvents for nitrocellulose and was compatible with nitrocellulose in all proportions.

In some cases in order to preserve the light color of the resin particularly where it is to be used in light colored coating compositions, molding compounds and the like it is desirable to cool the product after it has reached the desired degree of acidity under reduced pressure, or in the presence of some inert gas such as carbon dioxide, nitrogen and the like. Where the resin however is to be used in dark colored pigmented products where a light color is not so important the resin may be cooled in any suitable manner for example by allowing it to flow from the reaction vessel into shallow pans and while the color of the resin is affected by cooling in this manner its other properties are not.

A coating composition was prepared from the product obtained in the second example, namely, the salicylic phthalic glycerol resin, as follows:

20 parts of salicylic phthalic glycerol resin, 10 parts of nitrocellulose, low viscosity, 2 parts diethyl phthalate were dissolved in 40 parts butyl acetate, 60 parts ethyl acetate and 100 parts benzol. The resin was first dissolved in benzol and then added to the solution of the nitrocellulose in the butyl acetate, ethyl acetate and diethyl phthalate. A clear coating composition was obtained which when coated on metal and wood was found to adhere well, was tough and resisted weather conditions in a satisfactory manner. In order to obtain a lacquer enamel the clear lacquer made in accordance with the foregoing illustration was ground with 8 parts of titanox in a pebble mill for a sufficient period of time to prevent any subsequent segregation or separation of the pigment from the vehicle when used as a coating composition. The product was a white lacquer enamel having good covering power, adhesion and toughness and was found satisfactory when exposed to the weather.

The foregoing examples of lacquer and lacquer enamels are merely representative formulæ and the constituents may be varied in accordance with the purpose for which the material is to be used and also the method of application. The foregoing composition may be suitably applied by means of an air brush. Coating compositions adapted for application by means of ordinary brush may also be prepared by suitably altering the solvent or vehicle portion of the formula. Other pigments than that given may be used, for example for white enamels lithopone, zinc oxide and the like or mixtures of these and where other colored compositions are desired, for example a blue enamel may be prepared by the use of Prussian blue. Any of the well known pigments such as chrome yellow, Indian red and the like, or various dyestuffs may be used for coloring the coating composition depending upon the purpose for which the coating composition is to be used. For example for use on furniture a spirit soluble dye is to be preferred for the coloring matter and if desired the article to be coated can first be given a coating of the colored lacquer with a subsequent coat of the clear lacquer to give the furniture the requisite finish and appearance.

Also within the scope of the present invention is the preparation of complex resins prepared from more than two organic acids and a suitable alcohol. For example an ester was prepared from 122 parts of benzoic acid, 302 parts of rosin, 74 parts of phthalic anhydride and 94 parts of glycerol by heating the constituents to 290° C. with mechanical agitation under a reflux condenser. The temperature of the material was maintained at this point until the acid number of the product had reached 37. The product was somewhat soft, had a low melting point, was light in color and blended with nitrocellulose in all proportions. A coating composition prepared from this resin gave a coating which was tough, light in color, resistant to the action of water and withstood the action of weather well.

As an example of a plastic or molding composition of the shellac type the following is given.

30 parts of benzoic phthalic glycerol resin and 3 parts of nitrocellulose dissolved in 97 parts of acetone was used to impregnate a mixture of 3½ parts lamp black, 6½ parts asbestos fibre, 30 parts mica dust, 30 parts terra alba. After thorough mixing of the composition it was dried until the solvent was entirely removed. On molding using the method employed in molding compositions made up of shellac or shellac type compositions a satisfactory molded article was obtained having sufficient strength to withstand normal usage of the article so prepared.

As a brief description of method of molding shellac type composition the composition to be molded is first sheeted on rolls, a sufficient quantity of the sheet to make up the article to be molded is cut off and heated on a steam plate until plastic. The plastic sheet is then put in a mold and subjected to pressure in a hydraulic press, the platens of which are cooled by running water; when the article has become rigid it is removed.

To recapitulate the present invention is concerned with the preparation of complex artificial resins prepared from two or more organic acids and an alcohol, preferably a polybasic alcohol such as glycerol, which in the preferred form is characterized by the presence of a dibasic organic acid in the decomposition products of said resins toughened by means of a cellulose ester, preferably nitrocellulose. The resin may be decomposed and the dibasic acid isolated and identified by any suitable means. For example, hydrolysis of the resin by means of dilute caustic soda solution, with subsequent acidification of the alkaline solution and separation of the organic acid material may be used or in some cases destructive distillation of the resin will yield products which may be identified. It is preferable to separate the resin from the cellulose ester and other constituents if present before endeavoring to isolate the dibasic acid. To illustrate a method of isolating the resin from a coating composition, molding composition or the like, the following is given. A coating composition containing the resin is poured into an equal or greater volume of a hydrocarbon solvent such as benzol in order to precipitate the hydrocarbon insoluble material such as the cellulose ester and pigment and is then filtered. The filtrate is evaporated to dryness and heated at a temperature of 100-150° C. to remove all volatile material present. The solid residue is then extracted with an 80 per cent alcohol-water solution, preferably in soxhlet extraction apparatus, which serves to remove any of the usual plasticizing agents, particularly diethylphthalate, camphor and the like. The extracted material is then examined for the presence of organic acids in any suitable manner. To illustrate, phthalic anhydride or acid in the resinous residue may be identified as follows: Strong heating of the residue will cause the sublimation of a portion of the phthalic anhydride which may be collected and identified as such. Or a portion of the resin may be saponified by means of a dilute caustic soda solution. The alkaline solution is then evaporated to dryness and as a rough test a small quantity of sulphuric acid, together with a small quantity of phenol added to the dry residue, the mixture heated to 160° C. for a short time and tested for the presence of phenol phthalein. Another quicker but reliable test is made by fusing a small quantity of resorcinol in the presence of a drop or so of concentrated sulphuric acid. The fused material is then taken up in dilute caustic soda solution so as to be alkaline and the presence of phthalic anhydride indicated by the presence of fluorescein in the solution characterized by fluorescence of the alkaline solution.

What I claim is:—

1. A composition of matter comprising a cellulose ester and a benzoic rosin phthalic glyceride resin.

2. A composition of matter comprising nitrocellulose and a benzoic phthalic glycerol resin.

HARRY M. WEBER.